United States Patent
Ruiz

(10) Patent No.: US 6,816,064 B1
(45) Date of Patent: Nov. 9, 2004

(54) ESCAPE APPARATUS DETECTING AN EMERGENCY SITUATION AND PROVIDING ILLUMINATION

(76) Inventor: Carmelo C. Ruiz, 7550 Black Olive Way, Tamarac, FL (US) 33321

(*) Notice: Subject to any disclaimer, the term of this patent is extended or adjusted under 35 U.S.C. 154(b) by 0 days.

(21) Appl. No.: 10/382,304

(22) Filed: Mar. 5, 2003

(51) Int. Cl.⁷ ............................................. G08B 23/00
(52) U.S. Cl. .................... 340/321; 340/468; 340/573.1; 340/573.6; 340/425.5; 340/603; 340/686.1; 340/984; 30/123; 30/358; 30/366; 7/144; 7/158; 33/353; 33/327; 33/324; 33/328
(58) Field of Search .................. 340/321, 468, 340/573.1, 573.6, 425.5, 603, 686.1, 984; 30/123, 358, 366; 7/144, 158; 33/353, 327, 324, 328

(56) References Cited

U.S. PATENT DOCUMENTS

| | | | | |
|---|---|---|---|---|
| 5,122,788 A | * | 6/1992 | Sid-Ahmed et al. | ........ 348/571 |
| 5,642,567 A | * | 7/1997 | Lin | .............................. 30/366 |
| 5,845,550 A | * | 12/1998 | Edwards | ......................... 81/65 |
| 5,952,916 A | * | 9/1999 | Yamabe | ..................... 340/468 |
| D420,269 S | * | 2/2000 | Ben-Moshe | .................. D8/81 |
| 6,551,159 B1 | * | 4/2003 | Spinelli et al. | ............... 441/80 |
| 6,574,816 B2 | * | 6/2003 | Yu Chen | ....................... 7/100 |

FOREIGN PATENT DOCUMENTS

JP          10291439 A   *  11/1998     ............ B60Q/7/00

* cited by examiner

Primary Examiner—Daniel J. Wu
Assistant Examiner—Tai T. Nguyen
(74) Attorney, Agent, or Firm—Ronald V. Davidge

(57) ABSTRACT

A survival device for use in an emergency situation includes a battery, a lamp, and a detection circuit for detecting an occurrence of the emergency situation and for switching the lamp to be powered by the battery when such an occurrence is detected. In one form, the detection circuit detects a presence of water along a surface of the device, with safety tools for escaping from an submerged vehicle being provided. In another form, the detection circuit detects a failure of electrical service within a building, with safety tools for escaping a fire being provided.

13 Claims, 5 Drawing Sheets

US 6,816,064 B1

ESCAPE APPARATUS DETECTING AN EMERGENCY SITUATION AND PROVIDING ILLUMINATION

BACKGROUND OF THE INVENTION

1. Field of the Invention

This invention relates to apparatus providing tools for aiding an individual in escaping from an emergency situation and providing a light source actuated by detection of the emergency situation.

2. Summary of the Background Art

A number of individuals tragically die each year because of an inability to escape situations in which breathing suddenly becomes difficult or impossible, and from which escape is difficult because of darkness and obstructions. Two of the most commonly encountered types of such situations involve becoming trapped inside a submerged vehicle and becoming trapped inside a burning building.

When a vehicle submerges with its windows closed, its doors cannot be opened due to the exterior pressure from the surrounding water. The passenger compartment then fills with water, leaving, at most, a pocket of air in the uppermost part of this compartment. In order to escape, the occupants of the vehicle must free themselves from restraints, such as seatbelts, break a window to get out, and swim to the surface.

In a building fire, large portions of the building may quickly be filled with smoke, and electrical power may fail, leaving individuals trapped in the dark and unable to breathe. What is needed is a light source and a source of breathable air.

Tools including knife surfaces for cutting seatbelts and pointed metal pins for breaking glass are widely available. Examples of such devices are also described in U.S. Pat. Nos. 5,251,351 and 5,097,599. While the effectiveness of such devices in cutting belts and breaking glass has been clearly demonstrated, such devices can only be used if they can be found within a submerged vehicle, which may be damaged and inverted on the bottom of a body of water, by vehicle occupants often suffering from physical injuries and from panic. What is needed is a method for locating such tools under adverse conditions, such as under water in the dark. Furthermore, what is needed is a method providing illumination that can be used to aid in the process of escaping from the vehicle and through the water.

In a field not related to the problem of escaping from a submerged vehicle, U.S. Pat. Nos. 3,874,403, 5,188,143, and 5,655,561 describe devices used to detect the presence of water due to leaking pipes or appliances. The output of such devices can be used to shut off the water supply, to sound an alarm, etc.

U.S. Pat. Nos. 6,199,997 and 6,499,855 describe flashlights equipped with metal points for breaking glass, for use by policemen and fire fighters.

U.S. Pat. No. 5,245,943 describes flotation apparatus having an ability to produce illuminated messages calling for help.

Other patents, such as U.S. Pat. Nos. 4,233,970, 4,552,140, 4,793,342, 4,996,982, 5,529,058, 5,750,077, and 6,340,024 describe apparatus for providing breathable air to a user in a noxious environment.

SUMMARY OF THE INVENTION

In accordance with one aspect of the invention, apparatus is provided to aid an individual in escaping an emergency situation, with the apparatus including survival tools for escaping from the emergency situation, an electrically powered lamp, a battery, and a detection circuit detecting an occurrence of the emergency situation and switching the electrically powered lamp to be powered by the battery in response to detecting the emergency situation.

In one version of the invention, configured to facilitate escape from a submerged vehicle, the detection circuit detects a presence of water along a surface of the apparatus. The survival tools include a glass breaking tool, and a blade for cutting a seat belt, and may additionally include a canister holding a supply of breathable gas.

In another version of the invention, configured to facilitate escape from a burning building, the detection circuit detects an interruption in electrical service, with the survival tools including a canister holding a supply of breathable gas and a glass breaking tool.

DETAILED DESCRIPTION OF THE INVENTION

Figure 1:
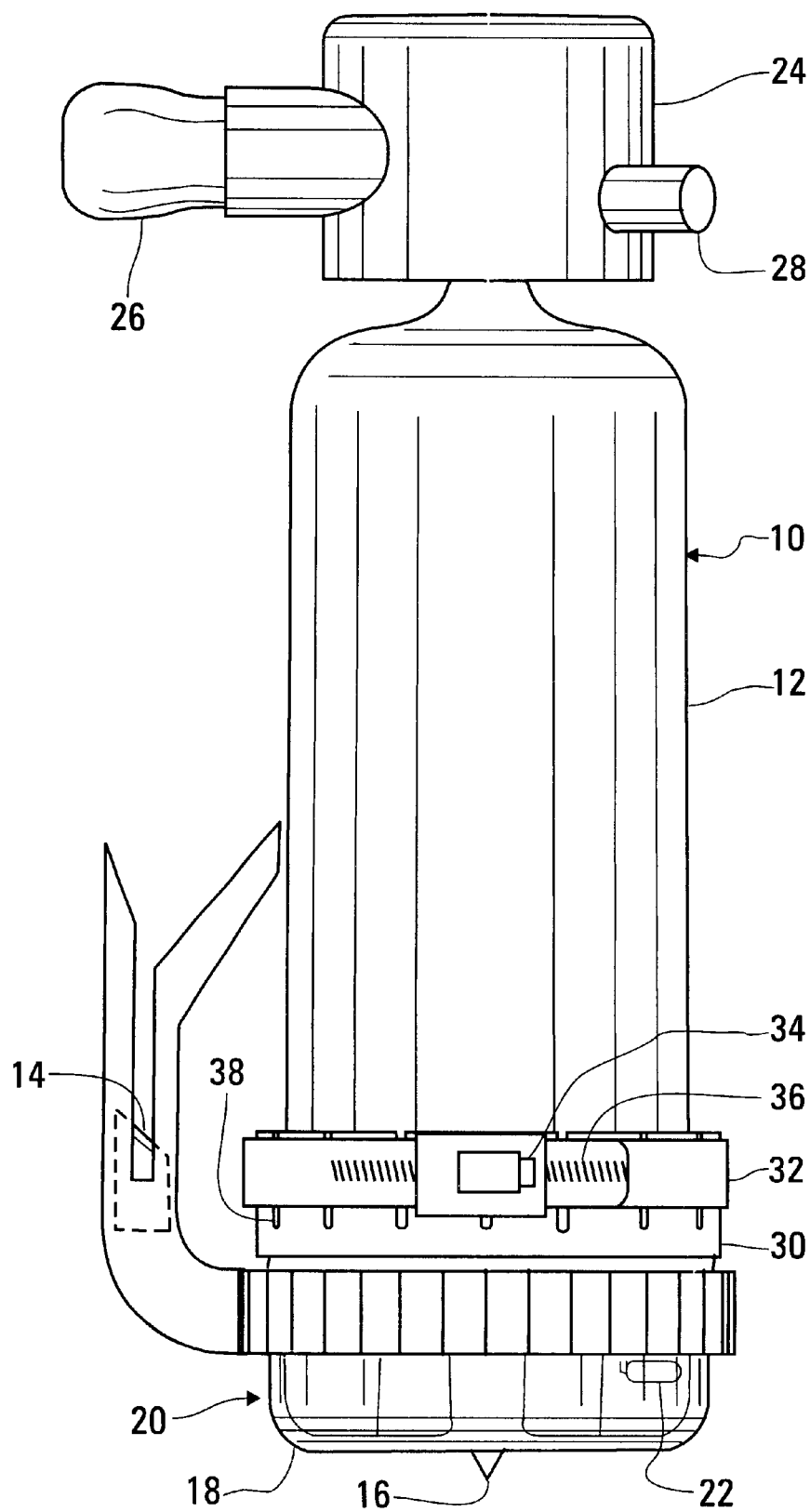
FIG. 1 is a side elevation of a safety device built in accordance with a first embodiment of the invention.

FIG. 1 is side elevation of a safety device 10 built in accordance with a first embodiment of the invention, to assist an individual in escaping from a submerged vehicle. The safety device 10 includes a canister 12 of breathable gas, such as compressed air or oxygen, a seat belt cutting blade 14, and a glass breaking point 16, together with a housing 18 holding a detection circuit 20 detecting a presence of water along a surface of the safety device 10 and a pair of lamps 22 that are turned on upon detection of the presence of water.

The canister 12 is preferably of a type that is easily used, even by someone with no experience with such devices, including a regulator 24 and a mouthpiece 26 through which the gas in the canister is breathed. For example, the canister 12 may be of a type sold under the trademark SPARE AIR, by Submersible Systems, Inc., of Huntington Beach, Calif., or of a type described in U.S. Pat. No. 4,996,982, the disclosure of which is incorporated herein by reference. Preferably, the operation of the canister 12 to provide air or oxygen can be started with a single breath. The canister 12 may be equipped with one or more knobs 28 to control operation of the device and to provide for refilling the device.

The housing 18 is fastened to the canister 12 by means of an adapter 30, which is held in place on the canister 12 by means of a clamp 32. For example, the clamp 32 is tightened on the "adapter 30 in the manner of an automotive hose clamp, with a cam 34 being turned by a screwdriver (not shown) so that individual slots 36 are successively engaged to tighten the clamp. Preferably, the adapter 30 includes a number of slots 38 providing for the inward deflection of the adapter 30 on the canister 12 as the clamp 32 is tightened.

Figure 2:
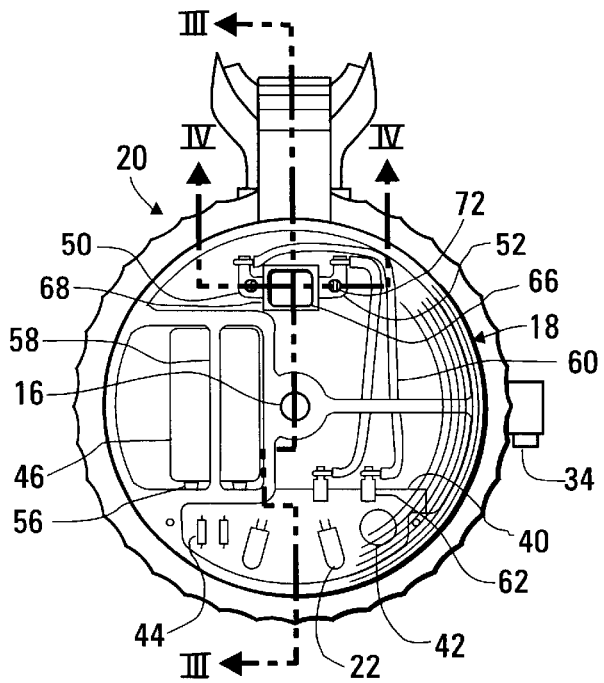
FIG. 2 is a bottom plan view of the safety device of FIG. 1.
Figure 4:
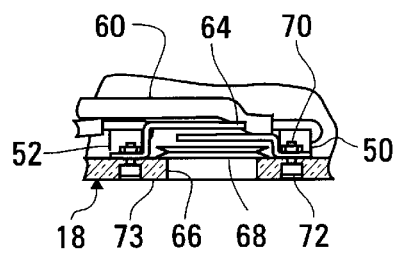
FIG. 4 is a fragmentary vertical cross-sectional view of the safety device of FIG. 1, taken as indicated by section lines IV—IV therein.
Figure 3:
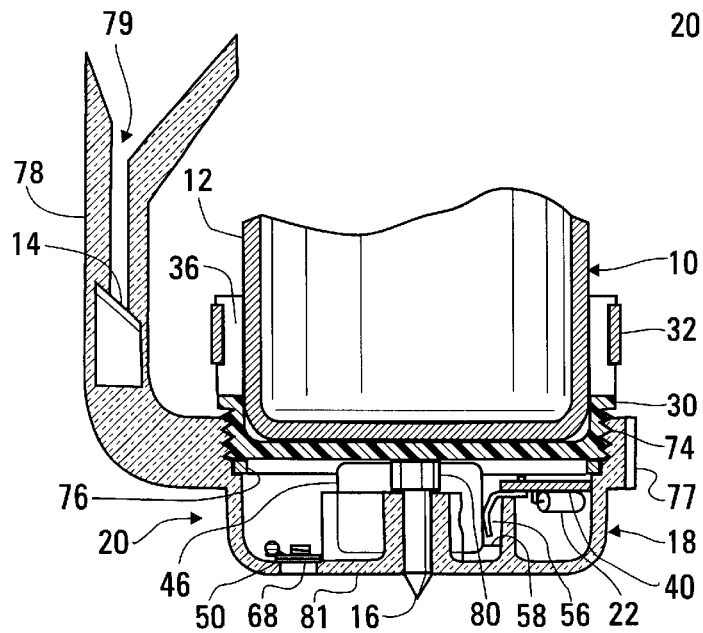
FIG. 3 is a fragmentary vertical cross-sectional view of the safety device of FIG. 1, taken as indicated by section lines III—III in FIG. 2.

Various elements within the housing 18 will now be discussed with reference being made to FIGS. 2–4. FIG. 2 is a bottom plan view of the safety device 10; FIG. 3 is a fragmentary vertical elevation thereof, taken as indicated by section lines III—III in FIG. 2; and FIG. 4 is a fragmentary vertical elevation thereof, taken as indicated by section lines IV—IV in FIG. 2. The housing 18 is composed of a transparent molded thermoplastic resin, such as a polycarbonate resin, so that illumination from the lamps 22 is externally visible, and so that various elements within the housing 18 are externally visible as shown in FIGS. 1 and 2. The lamps 22 are mounted within the housing 18 on a circuit board 40, together with other circuit elements, such as an FET 42 (field effect transistor) and resistors 44. The housing 18 also holds a battery 46 and actuator terminals 50, 52. The battery 46 is of a type having a pair of terminals (not shown) on an end 54, with each of these terminals being contacted by a spring clip 56 mounted on the circuit board 40. The battery 46 is preferably a lithium battery having a central depression resting on a rib 58 forming part of the housing 18 to prevent placement of the battery in an inverted orientation, which would provide voltage at a reversed polarity.

Figure 5:
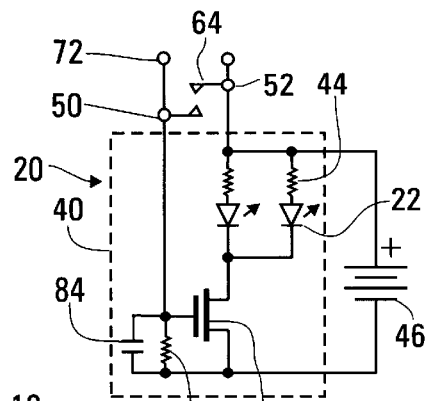
FIG. 5 is a schematic view of a circuit operating within the safety device of FIG. 1.

In a manner to be described in detail in reference to FIG. 5, the lamps 22 are turned on in response to the establishment of electrical conductivity between the two actuator terminals 50, 52, each of which is connected to the circuit board 40 by a wire 60 extending to a clip 62 mounted on the circuit board 40. Each of the actuator terminals 50, 52 includes a tab 64 extending adjacent an aperture 66 in the housing 18, with the two tabs 64 extending in a spaced-apart relationship so that they may be pressed together to establish conductivity between the terminals 50, 52 by means of finger pressure through the aperture 66. Watertight conditions are retained within the housing 18 using a diaphragm 68 adhesively attached to the housing 18 to extend across the aperture 66. For example, the diaphragm 68 is composed of an elastomeric material to provide easy deflection under finger pressure. Each of the actuator terminals 50, 52 is attached to be disposed within the housing 18 by a screw 70, having a head 72 exposed outwardly from the housing 18". Therefore, electrical conductivity is additionally established between the two terminals 50, 52 when the safety device 10 becomes submerged in water from a typical body of water, with the screw heads 72 serving as electrodes in a water detection circuit. The screw heads 72 may be recessed from the adjacent outer surface 73 of the housing 18, so that contact with a flat conductive object will not turn on the lamps 22.

The housing 18 is removably attached to the adapter 30 by engaging screw threads 74 of the adapter 30. A gasket 76 is compressed between the adapter 30 and the housing 18 to further maintain watertight conditions within the housing 18. When the housing 18 is unscrewed from the adapter 30, the battery 46 is exposed for easy removal and replacement. In this way, the housing 18 serves as a removable battery cover. A textured ring 77 is provided around the housing 18 to facilitate turning the housing 18 to remove it from the adapter 30 and to reinstall it.

As shown in the example of the figures, the housing 30 is molded as an integral part including a blade holder 78, including a slot 79, with the seat belt cutting blade 14 and the glass breaking point 16 both being molded as metallic inserts within the housing 30. Alternately, the glass breaking point 16 may be slidably mounted within the housing 30, with an elastomeric gasket or O-ring (not shown) being installed to maintain watertight conditions within the housing 30, and with the head portion 80 of the glass breaking point 16 holding the point 16 in place within the housing 30. While the central surface portion 81 of the housing 18 is shown as being flat, it is understood that this portion can be curved in a convex shape to provide the appearance of a dome.

FIG. 5 is a schematic view of the circuit operating within the safety device 10, with elements being accorded like reference numbers with the corresponding elements of FIGS. 1–4. Various elements are mounted on the circuit board 40. The lamps 22 are preferably high-intensity white LEDs (light-emitting diodes), which are switched on and off with an FET 42 (field effect transistor).

When electrical conductivity is established between the actuator terminals 50, 52, through a path within water between the screw heads 72 or by bringing the flexible tabs 64 of the terminals 50, 52 together, a positive voltage is placed upon the gate of the FET 42 from the battery 46, causing the FET 42 to switch on so that current flows through the lamps 22 and their associated resistors 44. Alternately, the gate of the FET 42 is additionally connected to the negative terminal of the battery 46 through a high-impedance resistor 82 and a capacitor 84, so that a positive gate voltage is retained, causing the lamps 22 stay on for a predetermined time after the cause conductivity between the terminals 50, 52 has been removed.

Thus, the occupant of a vehicle that has become submerged in water can find the safety device 10 within the passenger compartment of his vehicle even in the dark, at night, as the lamps 22 turn on when the water reaches the level of the device 10, establishing conductivity between the screw heads 72. If he is able to find the safety device 10 before the vehicle fills with water to this extent, he can turn the lamps 22 on by depressing the diaphragm 68 through the aperture 66. In either case, the lamps 22 can be kept in operation through continued pressure on the diaphragm 68 or through the charge remaining on the capacitor 84, with the light helping both in escape from the vehicle and in reaching the surface of the water.

After finding the safety device 10, the occupant of the vehicle can release himself or herself from his seat belt by placing the belt in the slot 79 within blade holder 78, and by moving the safety device 10 so that the blade 14 cuts through the seat belt. Then, he can break a window of the vehicle to escape by thrusting the safety device 10 against the window so that the glass breaking point 16 first contacts the glass.

Figure 6:
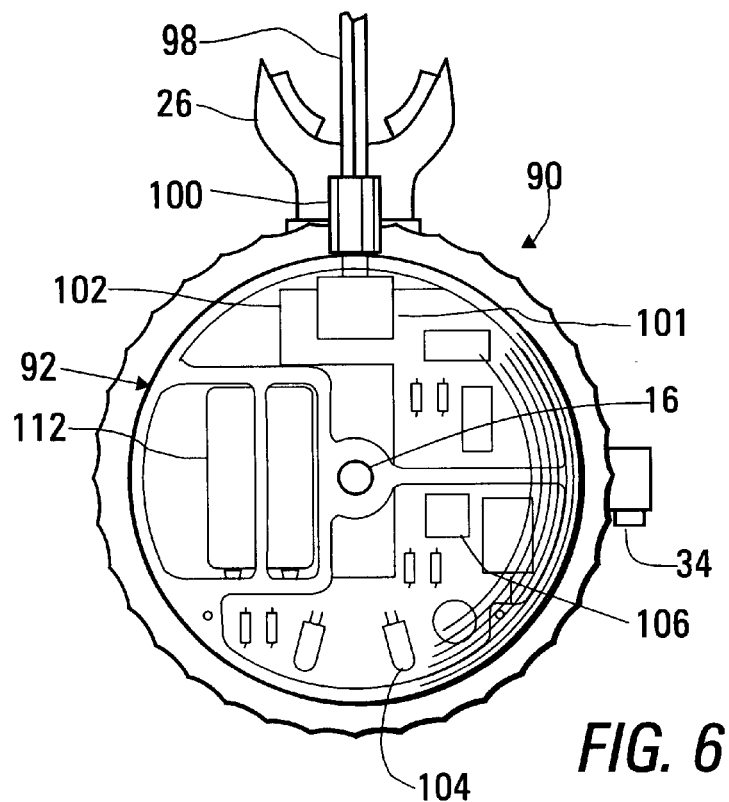
FIG. 6 is a bottom plan view of a safety device built in accordance with a second embodiment of the invention.
Figure 7:
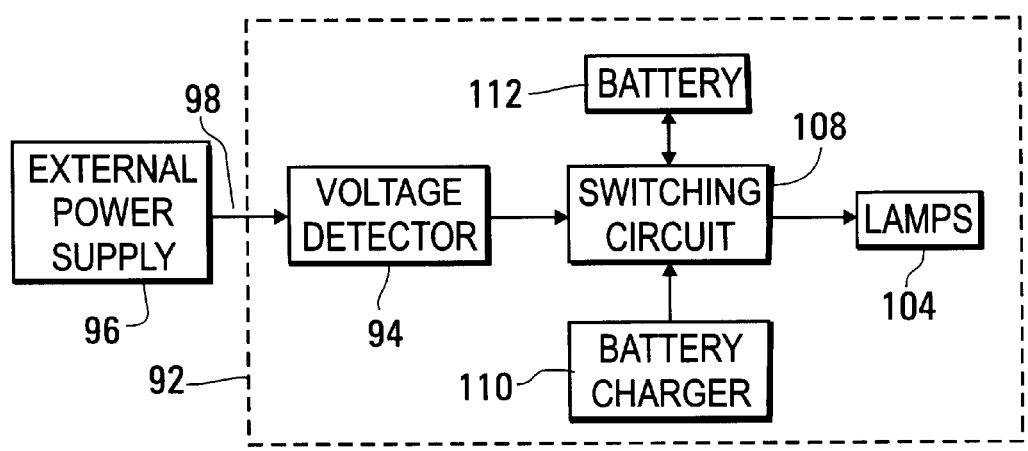
FIG. 7 is a block diagram of electronic circuits within the safety device of FIG. 6.

A safety device 90, forming a second embodiment of the invention, which is configured to help an individual in escaping from a building fire, will now be discussed, with reference being made to FIGS. 6 and 7. FIG. 6 is a bottom plan view of the safety device 90, while FIG. 7 is a block diagram of electronic circuits within the safety device 90. The safety device 90 includes a canister 12 having a regulator 24 and a mouthpiece 26, as described above in reference to FIG. 1, and additionally having a glass breaking point 16 and an adapter 30 as described above in reference to FIGS. 2 and 3.

Within a housing 92, the safety device 90 includes a voltage detector 94, detecting an interruption in primary electrical service as an indication that an emergency situation, which may be the result of a building fire, has occurred. This is accomplished by monitoring the output of an external power supply 96, which is plugged into a wall outlet (not shown). For example, the external power supply 96 produces a low-voltage direct current output, eliminating a need to employ high voltages to the devices within the housing 92. The output of the external power supply 96 is supplied to the devices within the housing 92 through a cable 98 including a cable connector 100, which is removably attached to a circuit board connector 101 within the housing 92. A circuit board 102, to which the cable connector 101, lamps 104, and various other components 106 are attached, extends within the housing 92. The housing 92 is preferably formed of a transparent plastic resin, such as a polycarbonate resin, rendering these components visible and providing for the illumination of areas external to the housing 92 by the lamps 104.

The housing 92 also includes a switching circuit 108, operating in response to the output of the voltage detector 94 to apply the output of a battery charger 110 to a rechargeable battery 112 when the a voltage from the output of the external power supply 96 is detected. On the other hand, when such a voltage is not detected, the output of the rechargeable battery 112 is applied to the lamps 104. The battery charger 110 operates in a conventional manner, applying electrical current to the rechargeable battery 112.

Thus, when the main electrical power in the building fails for any reason, the lamps 104 are turned on, providing a person in the building with an opportunity to locate the illuminated safety device 90. In the event of a fire, this individual can take the safety device 90, unplugging the cord 98 from the circuit board connector 101. His escape from the building is then aided by light from the lamps 104, by air or another breathable gas from the canister 12, and by the use, if necessary, of the glass breaking point 16.

The safety device 90 may additionally be adjacent or attached to a device for eye protection, such as goggles or a face shield.

Figure 8:
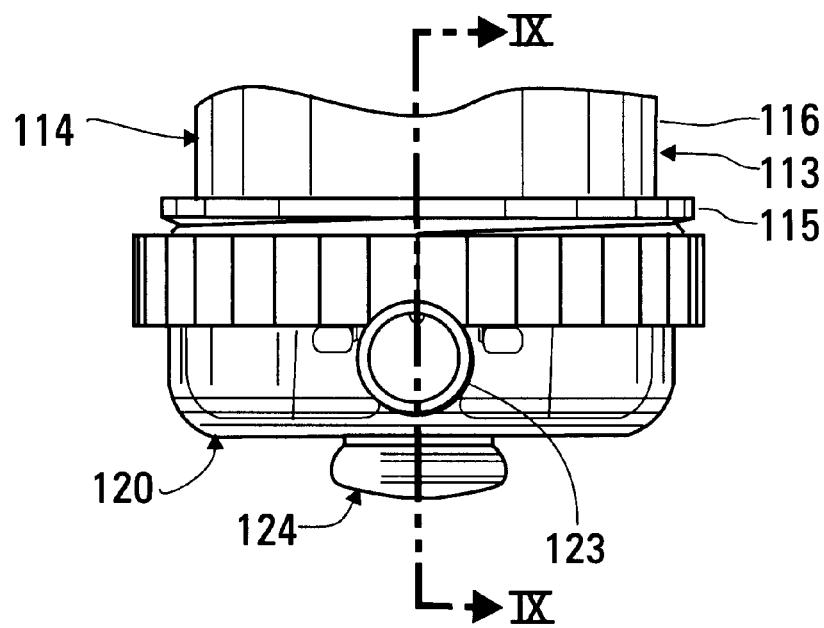
FIG. 8 is a fragmentary vertical cross-sectional view of an alternative safety device built in accordance with the first embodiment of the invention.
Figure 9:
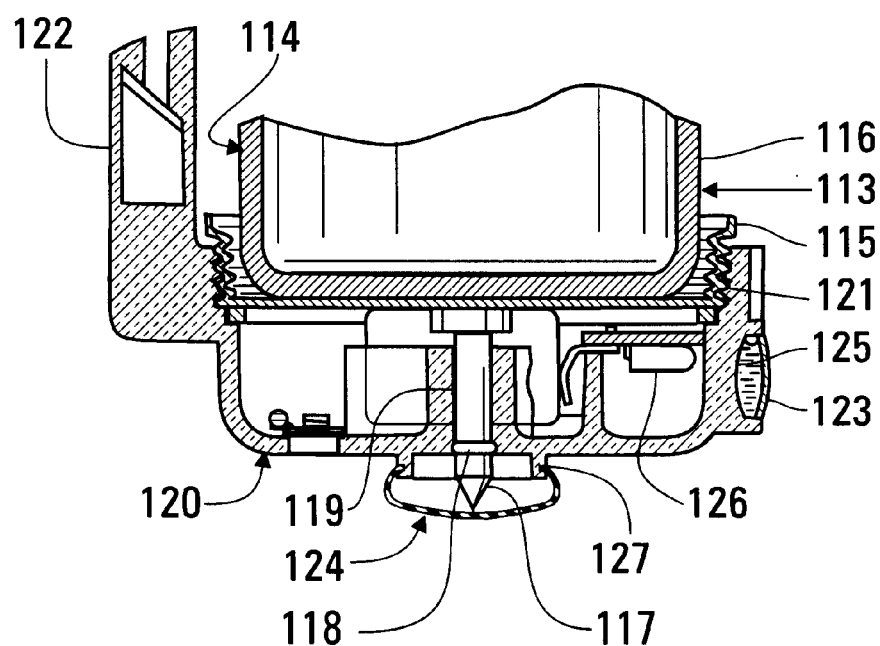
FIG. 9 is a fragmentary front elevation of the alternative safety device of FIG. 8.

Optional construction methods and features will now be discussed in reference to FIGS. 8 and 9, which are views of an alternative safety device 113, also built in accordance with the first embodiment of the invention, which has been described in detail above in reference to FIGS. 1–5. FIG. 8 is a fragmentary vertical cross sectional elevation of the alternative safety device 113, and FIG. 9 is a fragmentary front elevation thereof. In the alternative safety device 113, a canister 114 replaces the canister 12 of the safety device 10. The alternative canister 114 includes a metallic adapter 115, which is welded to the canister cylinder 116, replacing the adapter 30 and clamp 32. A glass breaking point 117 is also welded to the canister cylinder 116. Alternatively, the glass breaking point 117 may be welded to a reinforcing plate (not shown) extending across the end of the culinder 116. An O-ring 118 is held within a groove in the glass breaking point 117, to engage a mating hole 119 within a housing 120, so that watertight conditions are achieved as the housing 120 is screwed into place on the threads 121 of the metallic adapter 115. The blade holder 122 of the housing 120 is disposed more closely to the canister 114 because it is no longer necessary to clear the various components of the clamp 32 with the blade holder as the housing 120 is screwed into engagement with the adapter 115.

In the example FIGS. 8 and 9, the housing 120 is further modified to include an optional bubble level 123 and an optional cover 124 over the glass breaking point 117. The bubble level 123 includes a round cavity 125 filled with a fluid leaving an air bubble that orients itself upward to aid the individual trying to escape from his vehicle and through the water in case he becomes disoriented. Preferably, the alternative safety device 113 additionally includes a third lamp 126, which is directed to illuminate the bubble level 123 through the transparent material of the housing 120.

The cover 124, which is preferably composed of an elastomeric material, fits within a slot 127 of the housing 120, covering the glass breaking point 117 to prevent accidental injury or damage by this sharp object. Preferably, the material of the cover 124 splits when the glass breaking point 117 is used to break glass. Otherwise, the cover 124 can be pulled off the housing 120 before the point 117 is used to break glass.

It is understood that various of the construction methods and features that have been discussed in reference to FIGS. 8 and 9 may be applied to a safety device built in accordance with either the first embodiment of the invention or in accordance with the second embodiment of the invention, as described above in reference to FIGS. 6 and 7. It is further understood that these construction methods and features can be applied separately as well as in combination as shown.

Figure 10:
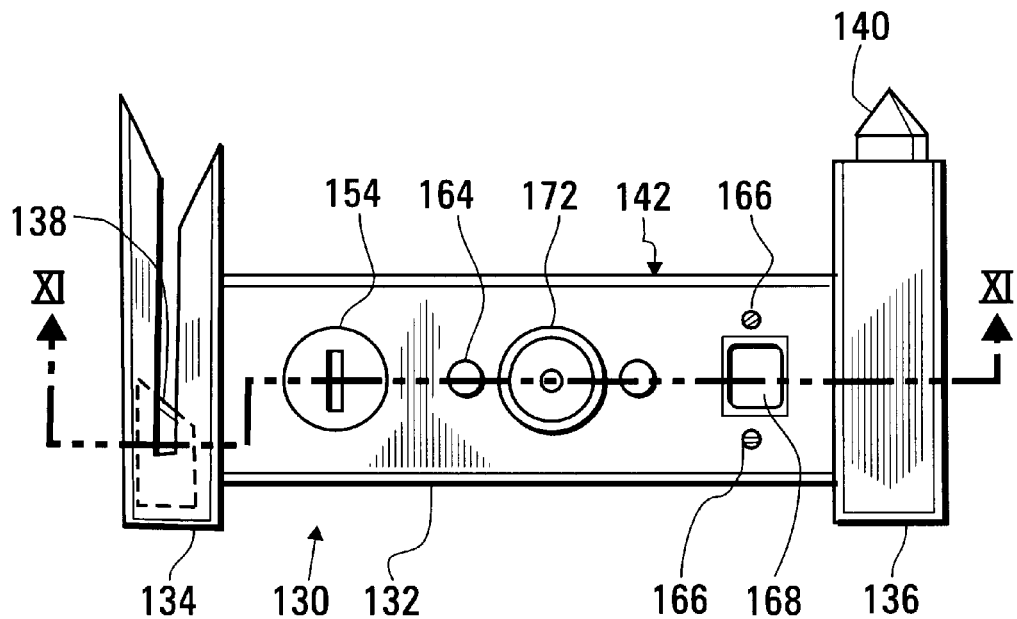
FIG. 10 is a plan view of a safety device built in accordance with a third embodiment of the invention.
Figure 11:
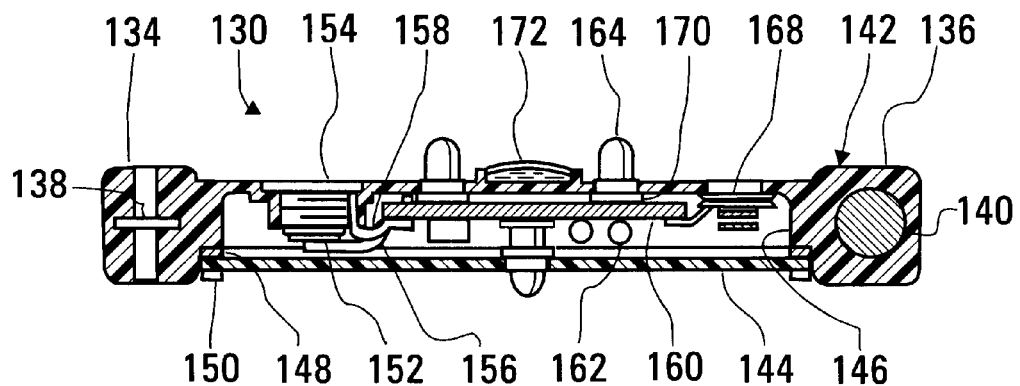
FIG. 11 is longitudinal cross sectional view of the safety device of FIG. 9, taken as indicated by section lines XI—XI.

A safety device 130, built in accordance with a third embodiment of the invention to aid the occupant of a submerged vehicle in escaping from the vehicle will now be discussed, with reference being made to FIGS. 10 and 11. FIG. 10 is a plan view of the safety device 130, while FIG. 11 is a longitudinal cross-sectional view thereof, taken as indicated section lines XI—XI in FIG. 10.

The safety device 130 includes a central handle portion 132, extending between a slotted seat belt cutting portion 134 and a glass-breaking portion 136. A seatbelt cutting blade 138 and a glass breaking point 140 are preferably molded as inserts within a housing 142 composed of a thermoplastic resin. A cover 144 extends along a cavity 146 within the housing 142, being held in place against a gasket 148 by a number of mounting screws 150. A battery 152, held within a metallic removable battery holder 154 establishes a voltage between a first spring clip 156, contacting a terminal of the battery 152, and a second spring clip 158, contacting the metallic battery holder 154. These spring clips 156, 158 are connected to a circuit board 160, extending within the cavity 146. Circuit elements 162 function as described above in reference to FIGS. 2–5 to illuminate lamps 164 when water causes electrical conductivity between screw heads 166 or when a diaphragm 168 is depressed. The lamps 164 extend through grommets 170 to maintain watertight conditions with the cavity 146. The safety device may also include a level indicator 172, such as a fluid-filled bubble level, to assist in orientation under water.

Thus, the lamps 164 are illuminated to assist in finding the safety device 10 underwater, in the dark. Furthermore, the lamps 164 may remain on to help in escaping under conditions of darkness.

While the invention has been described in terms of its preferred versions and embodiments with some degree of particularity, it is understood that this description has been given only by way of example, and that many changes in the combination and rearrangement of parts can be made without departing from the spirit and scope of the invention.

What is claimed is:

1. Apparatus to aid an individual in escaping an emergency situation, wherein said apparatus comprises:

survival tools, including a glass breaking point and a seat belt cutting blade, for escaping from said emergency situation;

an electrically power lamp:

a battery; and a detection circuit detecting an occurrence of said emergency situation by detecting a presence of water along a surface of said apparatus and switching said electrically powered lamb to be powered by said battery in response to detecting said emergency situation, wherein said detection circuit includes a pair of electrodes disposed at spaced-apart locations along said surface of said apparatus and a field effect transistor, wherein a first electrode of said electrodes is electrically connected to a first terminal of said battery, wherein a second electrode of said electrodes of is electrically connected to a gate of said field effect transistor, wherein a first terminal of said lamp is connected to a second terminal of said battery, and wherein a source and a drain of said field effect transistor are connected between a second terminal of said lamp and a second terminal of said battery.

2. The apparatus of claim 1, wherein said detection circuit additionally includes a capacitor connected between said gate of said field effect transistor and a terminal of said battery.

3. The apparatus of claim 1 wherein said survival tools additionally include a canister holding a supply of a breathable gas.

4. The apparatus of claim 1, wherein said survival tools additionally include a bubble level.

5. Apparatus to aid an individual in escaping an emergency situation, wherein said apparatus comprises:

survival tools, including a glass breaking point, a seat belt cutting blade, and a canister holding a supply of breathable gas, for escaping from said emergency situation;

an electrically power lamp;

a battery;

a detection circuit detecting an occurrence of said emergency situation by detecting a presence of water along a surface of said apparatus and switching said electrically powered lamp to be powered by said battery in response to detecting said emergency situation; and a housing fastened at an end of said canister, wherein said detection circuit includes a pair of electrodes disposed at a surface of said housing, wherein a remaining portion of said detection circuit, said lamp, and said battery are held within said housing, and wherein a portion of said housing is transparent, allowing light from said lamp to radiate outward therefrom.

6. The apparatus of claim 5, wherein said housing is removable to provide access to said battery.

7. The apparatus of claim 6, wherein said apparatus additionally comprises an adapter clamped to an end of said canister, and said housing is removably mounted to said adapter.

8. The apparatus of claim 5, wherein said glass breaking point extends from an end of said housing, and said apparatus includes a slotted blade holder extending from a side of said housing, and said seat belt cutting blade extends within a slot in said slotted blade holder.

9. The apparatus of claim 8, additionally comprising a cover fitting over a tip of said glass breaking point.

10. Apparatus to aid an individual in escaping an emergency situation, wherein said apparatus comprises:

an electrically powered lamp;

a battery, a glass breaking point;

a pair of electrodes disposed at spaced-apart locations along a surface of said apparatus a detection circuit detecting an occurrence of said emergency situation and switching said electrically powered lamp to be powered by said battery in response to detecting said emergency situation, wherein said detection circuit detects a presence of water along said surface of said apparatus in response to establishing electrical conductivity between said pair of electrodes;

a housing holding said glass breaking point, said electrically powered lamp, said battery, and said detection circuit; and an adapter for clamping said housing to an end of a gas canister.

11. The apparatus of claim 10, wherein said housing additionally holds a seat belt cutting blade, and said detection circuit detects a presence of water along a surface of said apparatus.

12. The apparatus of claim 11, wherein said housing additionally holds a bubble level.

13. Apparatus to aid an individual in escaping an emergency situation, wherein said apparatus comprises:

an electrically powered lamp;

a battery, a glass breaking point a detection circuit detecting an occurrence of said emergency situation and switching said electrically powered lamp to be powered by said battery in response to detecting said emergency situation, a housing holding said glass breaking point, said electrically powered lamp, said battery, and said detection circuit; and an adapter for clamping said housing to an end of a gas canister, wherein said housing is removably attached to said adapter, wherein said lamp is held within said housing, and wherein a portion of said housing is transparent, allowing light from said lamp to radiate outward from said housing.

* * * * *